US005229051A

United States Patent [19]

Martin

[11] Patent Number: 5,229,051

[45] Date of Patent: Jul. 20, 1993

[54] METHOD FOR MAKING SLEEVE ENCASED CONCRETE POSTS

[75] Inventor: Melvin D. Martin, Portland, Oreg.

[73] Assignee: Perma-Post International, Inc., Bellingham, Wash.

[21] Appl. No.: 725,955

[22] Filed: Jun. 27, 1991

Related U.S. Application Data

[63] Continuation of Ser. No. 407,523, Sep. 15, 1989, abandoned, which is a continuation-in-part of Ser. No. 51,901, May 18, 1987, abandoned, which is a continuation-in-part of Ser. No. 549,244, Nov. 4, 1983, abandoned.

[51] Int. Cl.[5] .......................... B28B 1/08; B32B 31/06

[52] U.S. Cl. ....................................... 264/71; 264/261; 264/262; 264/267; 264/275; 264/279; 264/336; 264/DIG. 57; 264/DIG. 59; 264/DIG. 64; 264/DIG. 69

[58] Field of Search .................. 264/69, 71, 72, 297.9, 264/297.8, 336, DIG. 59, 69, DIG. 43, 275-279.1, 261-263, 267, 269, 57; 249/48, 51, 120, 173; 52/724, 725, 515, 721, 727, 733, 740, 40, 309.17, 309.15; 256/19, 51, 55

[56] References Cited

U.S. PATENT DOCUMENTS

| | | | |
|---|---|---|---|
| 1,111,909 | 9/1914 | Kramer | 264/267 |
| 1,615,815 | 1/1927 | Birdsey | 52/725 X |
| 1,709,893 | 4/1929 | Bemis | 52/724 X |
| 1,858,512 | 5/1932 | Langenberg et al. | 52/725 |
| 1,971,051 | 8/1934 | Reiner et al. | 52/725 X |
| 2,853,742 | 9/1958 | Dasher | 264/DIG. 69 |
| 2,873,503 | 2/1959 | Davis | 249/48 |
| 2,991,533 | 7/1961 | Reid et al. | 249/120 |
| 3,336,649 | 8/1967 | Bruns | 264/71 X |
| 3,388,887 | 6/1968 | Frost, Jr. | 249/120 |
| 3,399,426 | 9/1968 | Weasel, Jr. | 264/DIG. 69 X |
| 3,479,704 | 11/1969 | Reed . | |
| 3,806,562 | 4/1974 | Lamort et al. | 264/DIG. 69 X |
| 3,957,250 | 5/1976 | Murphy . | |
| 4,028,288 | 6/1977 | Turner | 264/DIG. 69 X |
| 4,045,603 | 8/1977 | Smith | 264/DIG. 69 X |
| 4,067,826 | 1/1978 | Emery | 264/DIG. 69 X |
| 4,134,568 | 1/1979 | Christian | 249/173 X |
| 4,166,347 | 9/1979 | Pohlman et al. | 52/725 X |
| 4,187,352 | 2/1980 | Klobbie | 264/DIG. 69 X |
| 4,255,071 | 3/1981 | Koppers et al. | 52/724 X |
| 4,427,818 | 1/1984 | Prusinski | 264/DIG. 69 X |
| 4,522,669 | 6/1985 | Nordin et al. | 264/256 X |
| 4,600,459 | 7/1986 | Proctor | 264/267 X |
| 4,820,469 | 4/1989 | Walsh et al. | 264/DIG. 69 X |
| 4,824,627 | 4/1989 | Hammer et al. | 264/DIG. 69 X |
| 5,094,905 | 3/1992 | Murray . | |

FOREIGN PATENT DOCUMENTS

| | | | |
|---|---|---|---|
| 67958 | 10/1975 | Australia . | |
| 2012584 | 9/1971 | Fed. Rep. of Germany | 52/724 |
| 2144536 | 3/1972 | Fed. Rep. of Germany | 264/DIG. 69 |
| 2211562 | 9/1973 | Fed. Rep. of Germany | 264/DIG. 69 |
| 20076 | 6/1976 | Japan . | |
| 36542 | 9/1977 | Japan | 264/267 |
| 1017480 | 1/1986 | Japan | 264/133 |
| 1220763 | 1/1971 | United Kingdom | 52/725 |
| 2062048 | 5/1981 | United Kingdom | 264/267 |
| 2130784 | 6/1984 | United Kingdom | 264/71 |

*Primary Examiner*—Karen Aftergut

*Attorney, Agent, or Firm*—Robert L. Harrington

[57] ABSTRACT

A process for producing a concrete post having a sleeve that functions as a pouring form during pouring of the posts, a protective shield during shipping and storage thereof, and a strengthening component upon installation. The post is produced in a process whereby multiple, replacable sleeves are provided in a rack which are simultaneously filled from a hopper. The sleeve cavities are substantially free of rebar to facilitate pouring and reduce cost, the sleeve replacing the rebar as the strengthening component.

1 Claim, 2 Drawing Sheets

FIG. 1
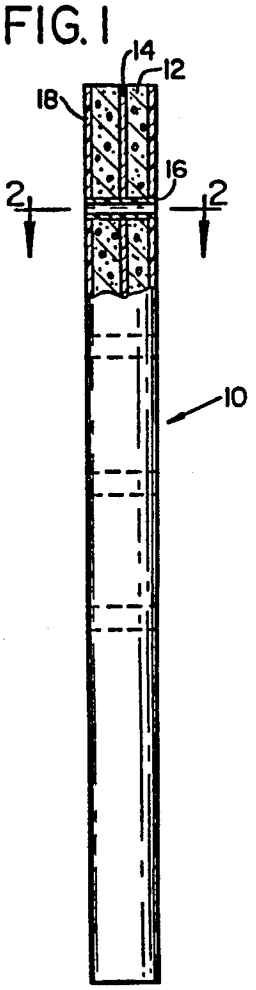
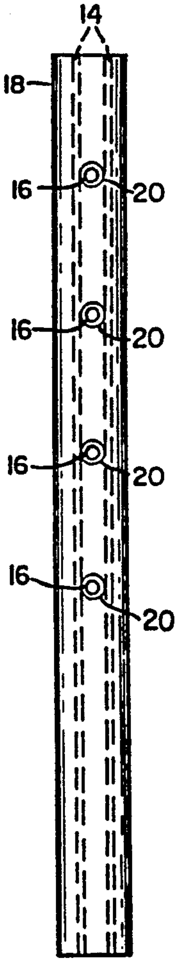
FIG. 3a
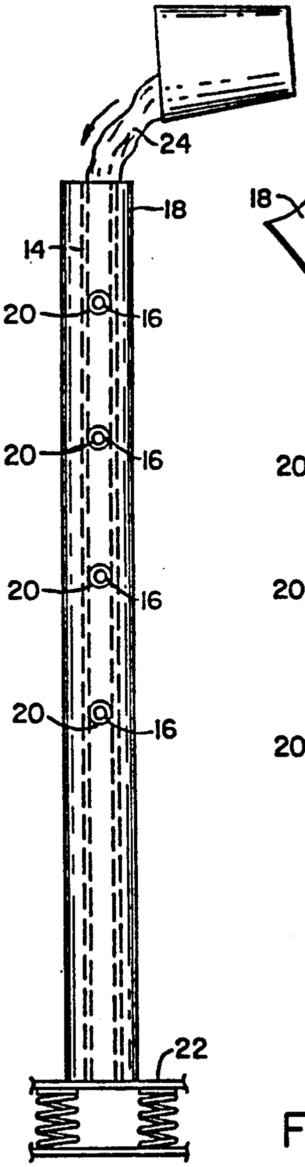
FIG. 3b
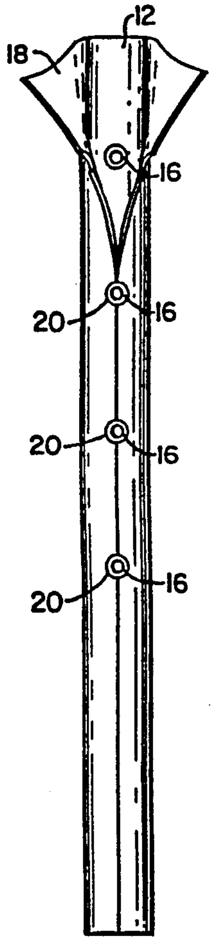
FIG. 3d
FIG. 3c
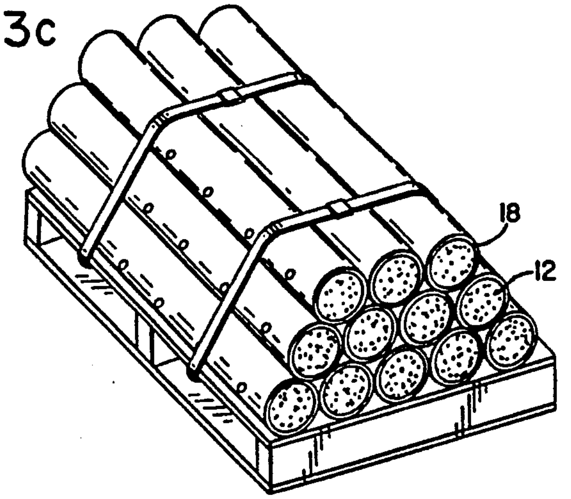
FIG. 2
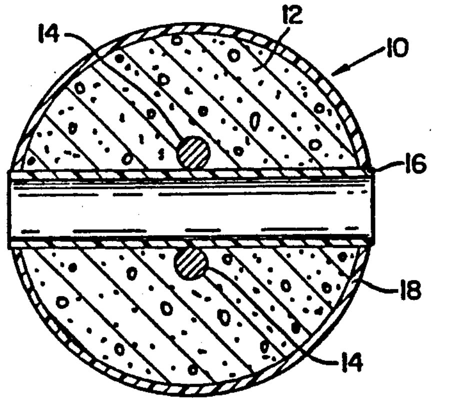

METHOD FOR MAKING SLEEVE ENCASED CONCRETE POSTS

"This is a continuation of co-pending application Ser. No. 07/407,523 filed on Sep. 15, 1989, now abandoned which was a continuation-in-part of U.S. Ser. No. 051,901, filed May 18, 1987 now abandoned, which application was a continuation-in-part of U.S. Ser. No. 549,244 filed on Nov. 4, 1983 now abandoned."

FIELD OF THE INVENTION

This invention relates to a process for making combination posts having concrete cores engaged in plastic sleeves, and particularly wherein the sleeves enhance production, storage, shipping and utilization of the posts.

BACKGROUND OF THE INVENTION

Concrete posts have never been able to effectively compete with wood posts, at least not in the USA where trees are in abundance. A wood post can be quickly fashioned from a log and on its way to the consumer. A typical concrete post is produced by first building a post form, making a concrete slurry, pouring the slurry into the form, and after allowing the concrete to set, stripping the form from the post. The multiple handling steps involved in this process as well as the curing time rendered concrete posts prohibitively expensive as compared to wood posts.

SUMMARY OF THE INVENTION

The present invention has, as a major objective, the reduction in cost of producing a sleeve-encased concrete post. The process provides for reduced handling and curing time while simplifying production, all without sacrificing utilization of the end product. In brief, the preferred embodiment of the invention involves the provision of inexpensive tubular sleeves that have multiple functions. The sleeves are supported in a rack that positions them for being filled with slurry concrete. Because the sleeve itself enhances the strength of the concrete core, a minimum of rebar is required, e.g. a single length of rebar down the center of the sleeve. The cavity of the sleeve is substantially uninhibited by the rebar and filling the sleeve with the concrete is accomplished in a far easier manner.

A hopper is used to fill the sleeves and after a minimum of setting time, the filled sleeves are removed from the rack and shipped. The rack is thus available for a new batch of the sleeves. The sleeves protect the "being cured" concrete posts during shipping and storing.

The posts additionally provide an environmental benefit in that the sleeves can be formed out of recyclable plastic, preferably of polyurethane and/or polyethelene. Because of the strength added by the sleeve, the ingredients of the concrete may also be modified to include filler of recyclable rubber, e.g. from discarded tires chipped to a size of 0.5 inch and smaller.

DETAILED DESCRIPTION OF THE DRAWINGS

The invention and its advantages will become more apparent by reference to the following detailed description and drawings wherein:

FIG. 1 is a partially sectioned view of a combination post in accordance with the present invention;

FIG. 2 is a view taken on section lines 2—2 of FIG. 1;

Figure 6:
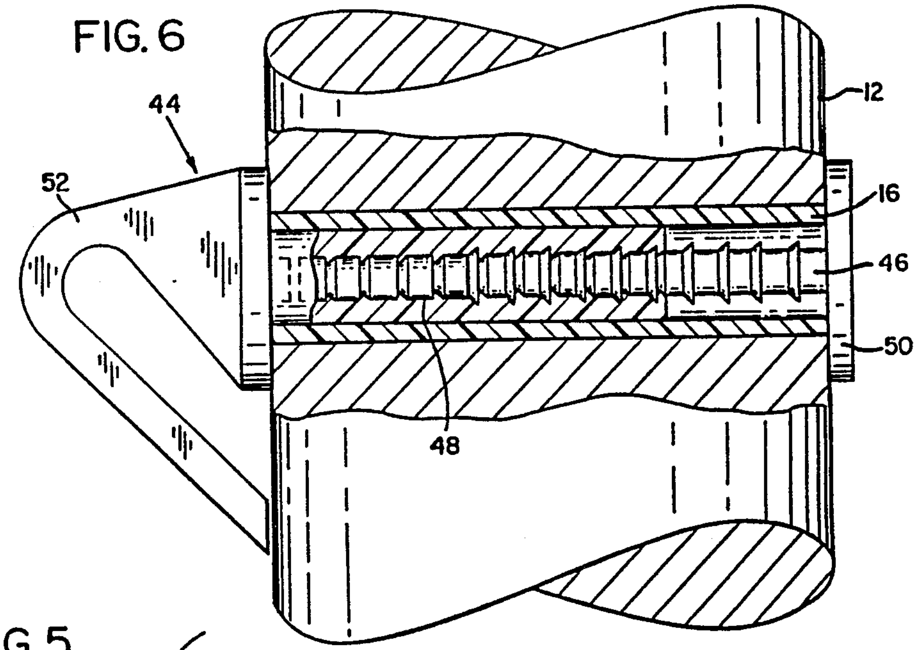
Figure 5:
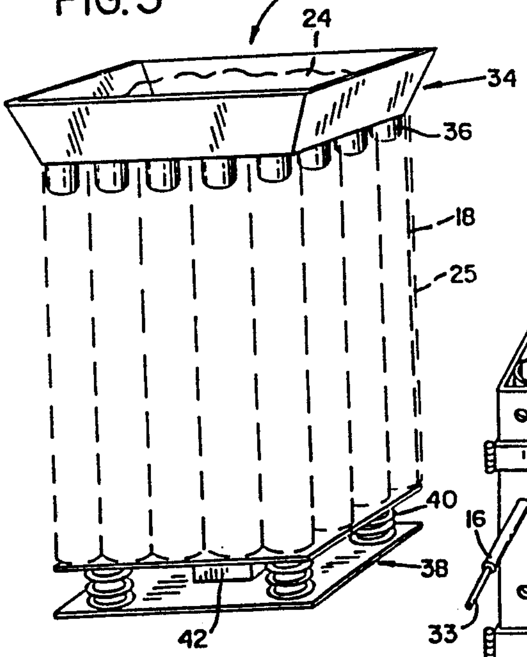
Figure 4:
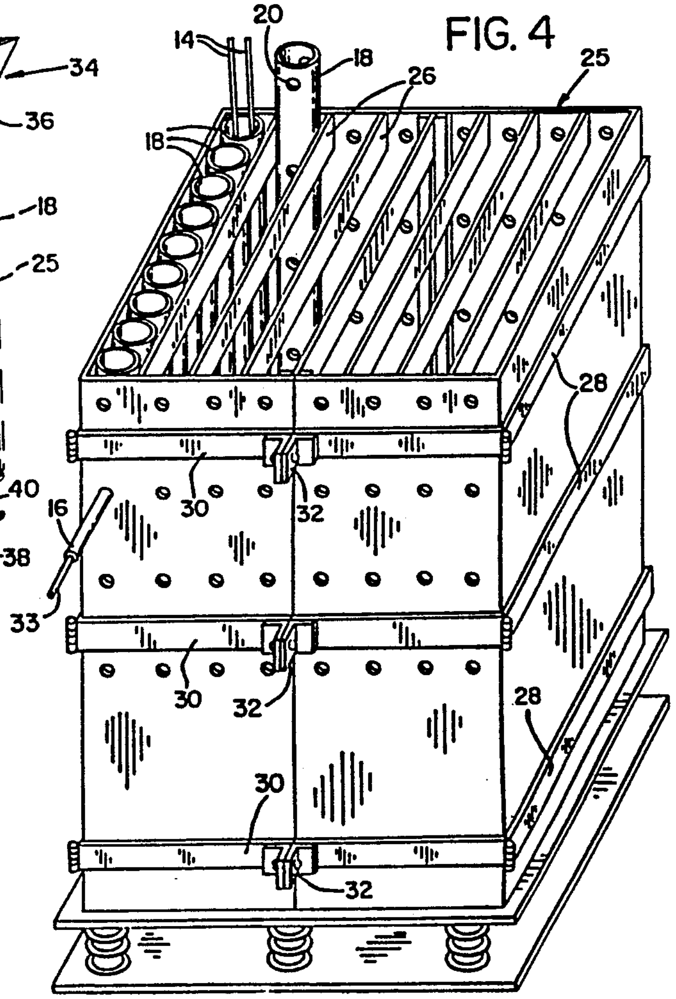

FIG. 3 *a*) and 3 *b*) illustrate production of the posts, FIG. 3 *c*) illustrates shipment and FIG. 3 *d*) an alternate step prior to installation, i.e. stripping the sleeve from the concrete core;

FIG. 4 illustrates the apparatus utilized for batch processing of the posts in accordance with the invention;

FIG. 5 schematically illustrates the method of pouring the posts of FIG. 4; and FIG. 6 illustrates a fastener mounted to a post.

Referring to FIGS. 1 and 2 of the drawings, a post 10 includes a concrete core 12 having two lengths of rebar 14, one length of the rebar positioned on each side of the tubular insert 16. The insert 16 may be eliminated and a single length of rebar inserted down the center of the core. Surrounding the core is a sleeve 18. Sleeve 18 is constructed of a tough but cushioning type of plastic material such as polyurethane or polyethelene. In the form shown, the post 10 can be shipped and the sleeve 18 functions as a shock absorber to protect the concrete core 12 from the typical shipping type damages.

Referring now to FIG. 3, the basic process for making the concrete posts is illustrated. Initially as shown in FIG. 3 *a*), the sleeve 18 may or may not be provided with holes 20 as desired for the tubular insert 16. The rebar lengths 14 are positioned in the sleeve 18 and in this condition the sleeves are positioned in a filling rack to be explained later. Of particular concern is the openness of the cavity of the sleeve to facilitate filling and the rebar is thus centrally positioned if used at all. The sleeve itself provides the needed strength to permit deletion of any rebar near the core edge. Once in the rack, the sleeves are ready to function as pouring forms.

FIG. 3 *b*) depicts sleeve 18 as if in a filling rack wherein the sleeve is supported on a vibrator mechanism 22. A concrete slurry 24 is poured into the sleeve, uninhibited by the rebar, and the vibrator unit functions to vibrate the concrete to insure complete filling of the form and thereby eliminating unwanted voids. When the sleeve has been filled with the concrete, it is allowed to dry long enough to set and then it is removed from the rack and shipped as illustrated by FIG. 3 *c*). The time involved in shipping and storage prior to use is adequate to allow for curing the concrete. Sleeve 18, during the curing cycle, functions as a protective encasement to minimize damage to the concrete core 12.

Reference is now made to FIG. 4 where the batch processing of the concrete posts is illustrated. A rack 25 is adapted to hold a large number of the tubular sleeves 18 as indicated. The rows are separated by braces 26 for supporting the sleeves in an upright position. The sleeves within each row are free of any braces and can be moved forward in the row for removal as will be explained later.

The side and back walls of the rack 25 are constructed of rigid support members 28 and the front of the rack is provided by a pair of gates 30 that are hingedly connected to the side walls. Latch 32 securely holds the gates 30 closed for containing the sleeves in the rack.

As illustrated in FIG. 4, the sleeves 18 are positioned in the rack by simply inserting them between braces 26. If inserts 16 are to be provided, the holes 20 in the sleeves are lined up with the front of the rack and a length of tubular insert 16 is inserted through the aligned holes. A steel rod 33 is preferably fitted through the insert to keep the insert from buckling during pouring as will now be explained.

As schematically illustrated in FIG. 5, a hopper 34 is provided with tubular outlets 36 that are arranged to line up with the tubular sleeves 18 contained in the rack 25. An appropriate mechanism (not shown) maneuvers the hopper 34 over the rack and in alignment with a number of the sleeves corresponding with the outlets. A quantity of concrete slurry 24 is then poured into the hopper to be directed through the outlets and into the sleeves 18.

A vibration mechanism 38 provides the bottom support to the rack 25. Springs 40 mounted in the flooring of the rack cooperate with a vibrating unit 42 to vibrate the sleeves 18 in the rack. Thus as the concrete slurry is poured into the sleeves it is vibrated down the sleeve around the insert 16, and rebars 14 (if used) to settle into the entire cavity defined by the sleeve.

A certain length of time is allowed to pass before the concrete sets, e.g. 6 hours, at which time the concrete filled sleeves can be removed from the rack. This is accomplished by unlatching the gates 30 and swinging the gates on their hinges to expose the concrete filled sleeves.

It is generally considered in the trade that concrete requires 48 hours to cure before it is safe to remove the forms. Previously this meant that the processing operation had to be shut down for the 48 hour period while the concrete was being cured. In the present process, the sleeves are simply converted in their function to a shipping sleeve to allow the combination concrete core and sleeve to be handled and shipped during the remainder of the 48 hour period. A new batch of sleeves 18 are prepared and the post making process is repeated.

In some instances fastening devices provided on the post are desirable. FIG. 6 illustrates an interlocking fastening device 44 particularly adapted for the tubular insert 16. A male shank member 46 is adapted to mate with a female shank member 48. A stop block 50 limits the insertion of male shank member 46 and a hook element 52 formed on the end of female shank member 48 limits the insertion of the female shank member. The hook element 52 can be in many different shapes and sizes to accommodate a variety of applications.

It will be understood that the embodiment of the invention described herein is applicable to any type or size of post. The post commonly used for fencing is 4 inches in diameter and 7 to 8 feet in length. No rebar is necessary or desirable at the edge of the sleeve, e.g. within an inch from the outer edge. Two bars or even one bar down the center of the sleeve (and thus the core) is desirable in some instances, e.g. when the post is to be driven, and otherwise it may be desirable to eliminate the rebar all together. The posts can be made smaller or larger, both in length and diameter without departing from the invention.

The invention produces a combination post with a number of surprising benefits. It is less expensive to produce. The sleeves provide the pouring form and permit removal of the encased concrete from the rack 25 at an early stage of the curing process. By compressing the concrete into the sleeve, the sleeve provides added strength that formerly was achieved only with the rebar imbedded in the concrete. Because the rebar can be eliminated, particularly around the edge, a concrete slurry pours more easily into the sleeve adjacent the inner wall thereof to achieve complete filling and compression that was not readily achieved in prior processes. The sleeve itself can be made out of recyclable plastic materials thereby reducing excess quantities of non-degradable discarded plastic. It is further believed that a certain quantity of the concrete rock filler may be replaced with chipped up tires, a benefit also realized because of the combined toughness resulting from the concrete being compressed into the tough plastic sleeve. The combined sleeve-concrete is long lasting, resists deterioration due to weather conditions and is competitive in price to wood posts.

The above benefits were simply not known or appreciated prior to the present invention. Examples of how others have come so close and yet so far from the invention are found in the disclosures of Murphy U. S. Pat. No. 3,957,250 and Brown Great Britain Patent No. 1,220,763. Murphy was concerned with weight and conceived of shipping plastic sleeves to the end user who would install the sleeves and then fill the sleeves with granular or particulate material. Brown created a metal skeleton surrounding the core edge, obviously not recognizing the strengthening benefit of the sleeve itself. He did recognize that "The filling of the tube (sleeve) presents difficulty". The cost of production is a major factor in determining commercial feasibility and the Brown process teaches away from the production of a cost competitive concrete post.

Another advantage of the present invention is the opportunity to provide various coloring, e.g. flourescent coloring. When the sleeves are formed coloring can be added and the posts can be more easily seen at night along roadways, etc.

Those skilled in the art will conceive of other benefits to be derived from the disclosed embodiment as well as variations in the structure and method of production, without departing from the invention as defined in the following claims.

I claim:

1. A method of producing a combination concrete core-plastic sleeve encased post wherein strength of said concrete core is enhanced by toughness of said plastic sleeve to thereby permit reduced rebar re-enforcement of said concrete core by eliminating rebar re-enforcement near said plastic sleeve which encases said concrete core, and to thereby produce a less expensive, long lasting combination concrete core-plastic sleeve encased post, said method comprising;

supporting a tubular sleeve produced from a recyclable, tough plastic cushioning material in an upright position, said tubular sleeve defining an inner wall surrounding a sleeve cavity, maintaining said sleeve cavity open to substantially uninhibited flow of concrete slurry by eliminating rebar re-enforcement adjacent said inner wall of said tubular sleeve, providing a quantity of tire chips no larger than about 0.5 inch and produced from discarded tires, producing a concrete slurry wherein a portion of rock filler used for producing said concrete slurry is replaced with said quantity of tire chips, filling said open tubular sleeve cavity with said concrete slurry containing said quantity of tire chips while vibrating said tubular sleeve to generate complete filling and compression of said slurry within and against said inner wall of said tubular sleeve, and allowing a drying time for said concrete slurry only adequate to solidify said concrete slurry into a partially cured concrete core within said tubular sleeve, then removing said partially cured concrete core filled tubular sleeve from said upright position to provide for full curing of said concrete core within said tubular sleeve into said combination concrete core-plastic sleeve encased post during interim storage and shipment of said combination concrete core-plastic sleeve encased post to an end user for installation, said plastic tubular sleeve functioning as a protective encasement and shock absorber for said curing concrete core during said interim storage and shipment of said combination post.

* * * * *